United States Patent [19]
Han et al.

[11] Patent Number: 5,991,542
[45] Date of Patent: Nov. 23, 1999

[54] STORAGE VOLUME HANDLING SYSTEM WHICH UTILIZES DISK IMAGES

[75] Inventors: Byron B. Han, Honolulu, Hi.; James F. Kateley, San Jose, Calif.; Colm Murphy, Tower Blarney; Kenneth Fitzgerald-Smith, Passage West, both of Ireland

[73] Assignee: Apple Computer, Inc., Cupertino, Calif.

[21] Appl. No.: 08/713,500

[22] Filed: Sep. 13, 1996

[51] Int. Cl.⁶ .................................................. G06F 15/16
[52] U.S. Cl. ............................................................ 395/712
[58] Field of Search ........................ 395/200.42, 200.45, 395/200.47, 200.49, 200.33, 712, 200.77

[56] References Cited

U.S. PATENT DOCUMENTS

| | | | |
|---|---|---|---|
| 4,864,572 | 9/1989 | Rechen et al. ............................ | 371/2.1 |
| 5,001,628 | 3/1991 | Johnson et al. ......................... | 364/200 |
| 5,179,378 | 1/1993 | Ranganathan et al. .................. | 341/51 |
| 5,230,052 | 7/1993 | Dayan et al. ............................. | 395/700 |
| 5,298,992 | 3/1994 | Pietras et al. ............................ | 348/415 |
| 5,325,532 | 6/1994 | Crosswy et al. ......................... | 395/700 |
| 5,353,061 | 10/1994 | Rodriguez et al. ..................... | 348/409 |
| 5,363,487 | 11/1994 | Willman et al. ......................... | 395/275 |
| 5,367,698 | 11/1994 | Webber et al. .......................... | 395/800 |
| 5,374,916 | 12/1994 | Chu ......................................... | 340/146.2 |
| 5,394,534 | 2/1995 | Kulakowski et al. ................... | 395/425 |
| 5,426,645 | 6/1995 | Haskin ..................................... | 370/118 |
| 5,452,454 | 9/1995 | Basu ........................................ | 395/700 |
| 5,493,649 | 2/1996 | Slivka et al. . | |
| 5,504,842 | 4/1996 | Gentile ..................................... | 395/114 |
| 5,555,416 | 9/1996 | Owens et al. ............................ | 395/700 |
| 5,604,906 | 2/1997 | Murphy et al. .......................... | 395/712 |
| 5,778,384 | 7/1998 | Provino et al. .......................... | 707/200 |
| 5,838,910 | 3/1996 | Domenikos et al. .............. | 395/200.33 |

*Primary Examiner*—Stuart S. Levy
*Assistant Examiner*—Kenneth W. Fields
*Attorney, Agent, or Firm*—Burns, Doane, Swecker & Mathis, L.L.P.

[57] ABSTRACT

Disk images, and the like, are used to emulate storage volumes for the distribution of computer software. An image of a data storage volume, such as a hard disk drive, is stored in a file having a format that enables it to exhibit a behavior which is the same as the storage volume itself. The image files are accessed by means of an associated driver which can support a variety of different file system protocols, thereby permitting the files themselves to be independent of the format requirements of particular file systems. The data in the image file can be compressed in a manner such that a storage volume being emulated appears to be of a specified size, while actually requiring less space to store its contents. With these properties, the image files can be mounted in the manner of a hardware storage device, and large files can be readily transmitted and downloaded in an electronic format. Since the files are preserved in their original form, end-to-end verification remains possible, to ensure the integrity of the downloaded files. Multiple images can be combined into a single tome, for installation at a remote site using a one-button approach.

20 Claims, 5 Drawing Sheets

STORAGE VOLUME HANDLING SYSTEM WHICH UTILIZES DISK IMAGES

FIELD OF THE INVENTION

The present invention is directed to the replication and distribution of electronic files, such as computer software, and more particularly to a system for the creation and manipulation of images of electronic storage media.

BACKGROUND OF THE INVENTION

With the expanding use of computers in widely varied environments, and more significantly the increasing size of software programs and data files that are employed on those computers, the dissemination of computer software is becoming significantly more complex. Originally, when software programs and data files were of relatively small size, distribution of the programs and files by means of floppy disks was feasible. However, as the processing power of computers continues to expand, and internal storage media such as hard disks offer greater capacity, there is a tendency for software programs to become larger in size. Concomitantly, data files which are processed by those programs, particularly files relating to images and other graphics, have also increased in size. As a result, floppy disks no longer offer a convenient medium for distributing electronic data, due to their limited storage capacity. While a user may be quite willing to install a new software program that is contained on a few floppy disks, the time and effort required to install a large program that occupies a significant number of disks to store all of its contents, e.g., 20 or more disks, becomes intolerable.

For this reason, other media having larger storage capacity, such as CD ROMs, have been employed more recently for the distribution of larger amounts of software. While these other types of media decrease the time and effort required to install the software, they still have certain limitations associated with them. For example, the need to separately package and ship each CD ROM, or the like, requires an appreciable amount of overhead on the part of the software manufacturer. In addition, the storage of the media, both at retail outlets and at the end user's site, represents a growing burden as the number of programs and data files continues to expand.

To overcome these limitations associated with the limited size of transportable storage media and the need to accommodate or dispose of the media, it is desirable to distribute software, including both programs and data files, in an electronic format. Currently, installer programs are available which provide a user with an opportunity to install a program on a computer from a remote site. In one type of installer, a large number of bundled files are downloaded from the remote site in a compressed format, and then expanded on the user's computer. From this large number of files, the user picks the few that are desired, and they are installed on the user's computer system. From the standpoint of user convenience, this approach is less than ideal, because of the time spent downloading a number of unnecessary files, as well as the effort required by the user to select the needed files. In contrast to this approach, a "one-button" installation system is preferable. In such an approach, the user is only required to perform a single action, e.g., select a single button in a graphical user interface, to have the appropriate files downloaded and installed.

Typically, in a one-button installer, all required files are compressed into a single file known as a "tome." The tome is provided together with an installer program and a script file that is downloaded to the user's site. The installer program, together with the information contained in the script file, expands the tome back into the individual files, and installs the files onto the user's computer system. To perform the installation, the user is only required to select the installer program to run. All other actions are carried out automatically thereafter.

While the latter approach offers the convenience of a one-button installation system, to date it has been limited in the types of programs with which it can be employed. More specifically, due to restrictions associated with the number of resources that can be handled in a tome, it is not possible to use the one-button installer system for programs having large files, or a large number of files, such as operating system software.

Furthermore, since installer programs operate on files individually, they are not able to ensure the integrity of files installed on the user's system. More particularly, since each individual file is compressed and expanded during the installation process, it is not possible to provide end-to-end verification of each file. For example, the original file may have a checksum value tagged to it, to provide for verification of the integrity of the file when it is copied. However, as part of the process of compressing the file, the checksum value is not always preserved. For example, the file might be renamed. Consequently, when the file is expanded and installed, it is not impossible to employ the checksum value to verify the integrity of the file.

SUMMARY OF THE INVENTION

In accordance with the present invention, the foregoing limitations associated with the distribution of computer software are addressed through the use of disk images, and the like, to emulate storage volumes. An image of a data storage volume, such as a hard disk drive, is stored in a file having a format that enables it to exhibit a behavior which is the same as the storage volume itself. The image files are accessed by means of an associated driver which can support a variety of different file system protocols, thereby permitting the files themselves to be independent of the format requirements of particular file systems. The data in the image file can be compressed in a manner such that a storage volume being emulated appears to be of a specified size, while actually requiring less space to store its contents. With these properties, the image files can be mounted in the manner of a hardware storage device, and large files can be readily transmitted and downloaded in an electronic format. Since the files are preserved in their original form, end-to-end verification remains possible, to ensure the integrity of the downloaded files. Multiple images can be combined into a single image file tome, for installation at a remote site using a one-button approach.

The foregoing features of the invention, as well as the advantages provided thereby, are explained in greater detail hereinafter with reference to exemplary embodiments illustrated in the accompanying drawings.

DETAILED DESCRIPTION

To facilitate an understanding of the present invention, it is described hereinafter with reference to specific examples relating to the downloading and installation of software on computers. For example, the installation may take place at the time of computer manufacture, or occur in a private context via an enterprise network or a world-wide network, such as the internet. It will be appreciated, however, that these embodiments are merely exemplary, and do not constitute the only practical applications of the invention. Rather, the invention can be successfully utilized in a variety of different situations in which it is desirable to replicate and/or disseminate software in an electronic format.

Generally speaking, the present invention is based upon the use of storage media images to facilitate the dissemination and access to large quantities of data. In the context of the present invention, a disk image is a file which is located on any suitable storage medium and which has properties that cause it to appear to computer system resources as if it were a physical storage device itself, e.g. a hard disk drive. In one aspect, the present invention is directed to a multiple-format disk image, in which the contents of a storage medium can be stored in any one of a variety of formats that provide the most efficient use of backing storage commensurate with the needs of the user. In another aspect, the present invention is directed to a disk image device driver which allows disk images of any of a variety of formats to be mounted and used in the same manner as any type of physical storage device.

Figure 1:
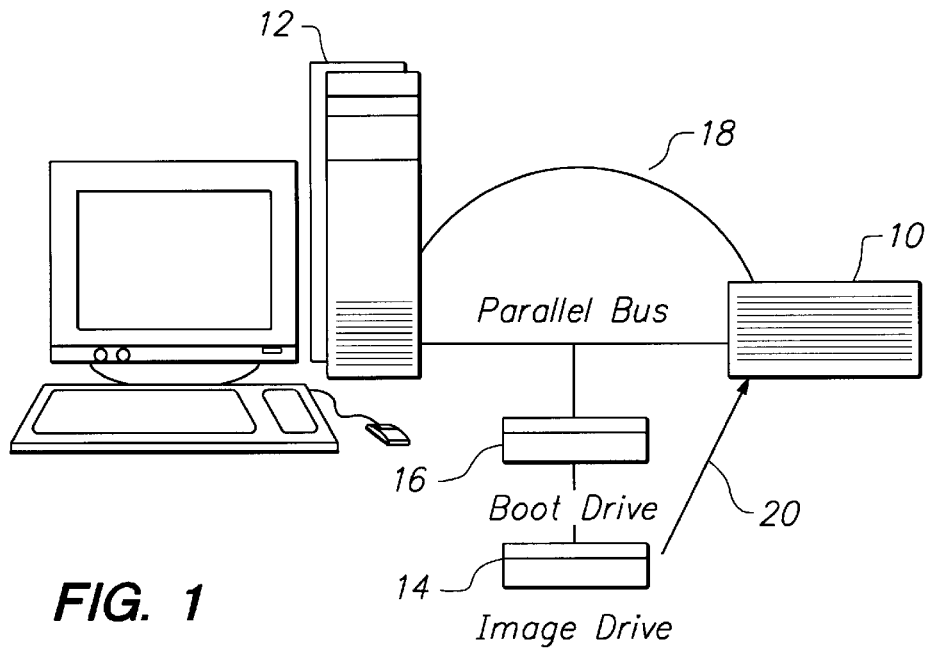
FIG. 1 is a general block diagram of one arrangement for downloading software onto a computer.

One environment in which the features of the present invention are particularly desirable is the downloading of software onto computers. For example, most new computers are typically sold with bundled software, in which a number of programs are installed on the storage media, e.g., hard disk, of the computer. To this end, the software must be downloaded and installed at the manufacturing site. In one approach, this can be accomplished through the use of a disk image file. Referring to FIG. 1, a software bundle is to be downloaded onto a hard disk in a target computer 10. The downloading operation is carried out by a controller computer 12. In operation, the controller 12 creates a disk image of a hard disk drive onto which the software bundle is to be downloaded. Preferably, the image is created in the controller's internal RAM. For explanation purposes, the image drive is illustrated in FIG. 1 as a separate external drive 14. It will be appreciated, of course, that the image drive could actually be created on an external device, such as a RAM disk or a hard disk drive, as illustrated in FIG. 1, rather than in the controller's internal memory.

The creation of the image is carried out by downloading the software bundle to the image drive and verifying its integrity, for example, by means of a checksum operation. Thereafter, a target computer 10 is connected to the controller and powered up. Preferably, the computer 10 is connected to a boot drive 16, from which the computer begins a startup operation. At a particular point in the boot process, the computer communicates with the controller over a serial cable 18. In response to a signal from the computer 10, the controller 12 downloads the software bundle onto the internal disk drive of the computer 10. This procedure is accomplished by means of a block-to-block transfer from the image drive 14 to the target drive of the computer 10 over a parallel bus, as illustrated by the arrow 20 in FIG. 1. For further information regarding this operation, reference is made to copending, commonly assigned U.S. application Ser. No. 08/383,864, filed Feb. 6, 1995, the disclosure of which is incorporated herein by reference thereto.

In the arrangement depicted in FIG. 1, the downloading of the software onto the internal drive of the target computer 10 is controlled by the controller 12. In such a case, the efficiency with which the software bundle can be downloaded onto a plurality of target computers is determined by the resources of the controller 12. Specifically, the controller interacts with one target computer 10, or at most a limited number of target computers, at one time. In accordance with the present invention, the efficiency with which the downloading operation can be carried out is enhanced by making the disk image file mountable in each target computer 10. If the disk image file is mounted within the computer 10, the downloading operation can be controlled by the individual target computers, rather than the controller 12. As such, the same software bundle can be downloaded onto a potentially unlimited number of target computers at one time.

The mounting of a storage medium refers to the process by which information is provided to the file management facility of a computer's operating system, so that the computer can access information on the storage medium. In the following discussion, the term "volume" will be used to refer to different types of storage devices. In essence, a volume can be any piece of a storage medium, such as a disk, which is formatted to contain files. A volume can be an entire disk, or only part of a disk. For example, a floppy disk might comprise a single volume. A larger storage device, such as a hard disk or a file server, can be divided into many different volumes, or partitions, each of which can be formatted in a different manner.

Figure 2:
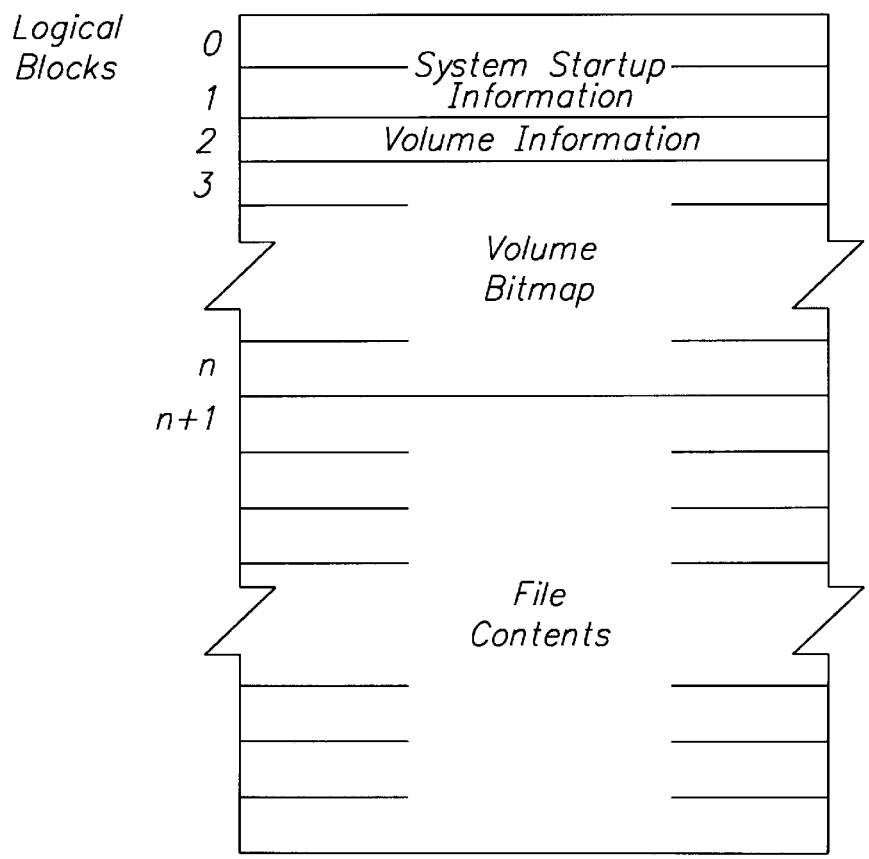
FIG. 2 is a block diagram of the organization of data in a storage volume.

Typically, information in a volume is organized in the form of logical blocks, each of which contains a predetermined amount of information, e.g., 512 bytes. One example of the organization of the logical blocks in a storage volume is shown in FIG. 2. In this particular arrangement, the first two blocks in the volume are known as its boot blocks, and contain information that is read at system startup. This information might include, for example, configurable system parameters, such as the capacity of various queues, and the number of open files that are allowed at any given time. The next logical block of the volume contains volume information, which is discussed below. The following group of logical blocks (3–n) contain the volume bitmap, which records whether each block on the volume is used or unused. The remaining logical blocks in the volume contain the contents of the files which are actually stored in the volume.

The volume information in logical block 2 comprises various fields that are used by the operating system's file management facility, such as the volume name, it size, and the number of files on the volume. This information is initially created when the volume is initialized, or formatted, and modified thereafter whenever the file management system writes information to the volume. Each time a volume is mounted, the file manager reads the volume information from the logical block and stores it in a predetermined area of the computer's working memory, e.g. its RAM. Once the file manager has retrieved and stored the volume information, the volume is considered to be mounted, and the file manager can access information contained in the remaining blocks of the volume. A volume becomes unmounted when the file manager releases the memory that was used to store the volume information.

Typically, each volume that is mounted in a computer system represents a different physical device, e.g. a floppy disk, or a portion of a physical device, such as a partition on a disk drive. In contrast, a disk image is not associated with any particular physical device. Rather, it comprises a file in some storage medium, referred to hereinafter as the backing store, and is capable of behaving in the manner of a physical device. Thus, the file itself comprises logical blocks containing the information that is normally associated with a physical volume, i.e. system startup information, volume information, and a volume bitmap, in addition to the actual data of the file itself.

Figure 3:
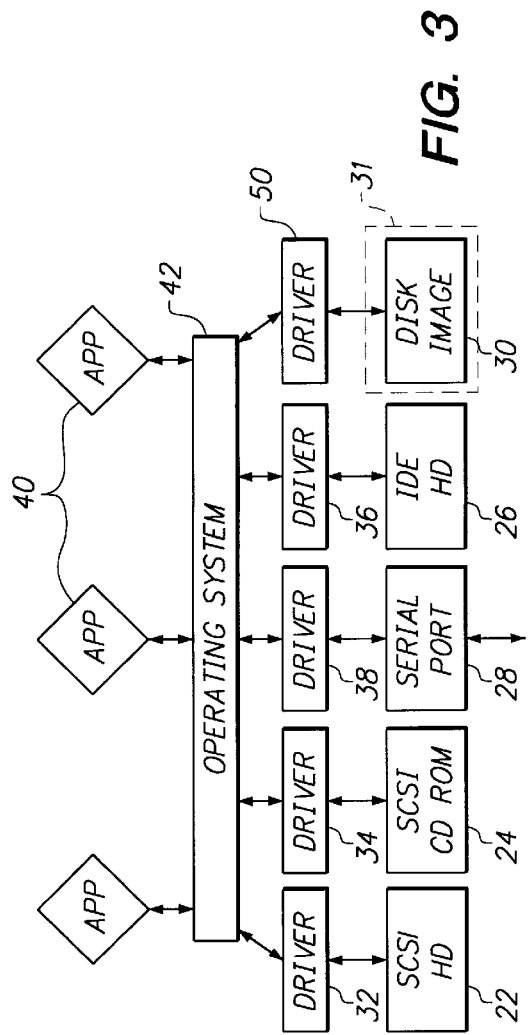
FIG. 3 is a block diagram of a computer system having a number of physical I/O devices and access to a disk image file.

In operation, application programs running on a computer communicate with the storage volumes by means of associated drivers. For example, FIG. 3 illustrates a computer system having various physical volumes mounted thereon. These physical volumes might include local devices, for example a SCSI hard disk drive 22, a SCSI CD-ROM drive 24, and an IDE hard disk drive 26. A serial port 28 provides access to other remotely located physical devices (not shown), for example by means of a communication network. Each of these devices has an associated driver 32–38 stored in the memory of the computer. Whenever an application program 40 running on the computer desires to read or write information on one of these devices, it sends a logical address for the desired information to the computer's operating system 42. In response thereto, the operating system determines which storage device that logical address pertains to, and a corresponding physical address on that device. The operating system provides the physical address, and other associated commands, such as read or write, to the appropriate driver, which then accesses the device to obtain or provide the data at the indicated address.

In a similar manner, when a disk image is mounted, a driver is employed to carry out the task of providing data to the image file and retrieving data therefrom. As shown in FIG. 3, a disk image 30 of a volume is located on a suitable backing store 31, and is mounted as a local volume in the computer system. Communications with the disk image are carried out through an associated driver 50. This driver is loaded at system boot time, or upon mounting of the disk image, in the same manner as the conventional drivers 32–38. Once loaded, the driver carries out the actual mounting operation, e.g. store the volume information in an allocated portion of memory, and the like. The backing store 31 could be one of the other local physical devices 22, 24 or 26, or it could be some other local or remote device. By means of this arrangement, the disk image 30 appears as another physical storage device to the operating system.

Figure 4A:
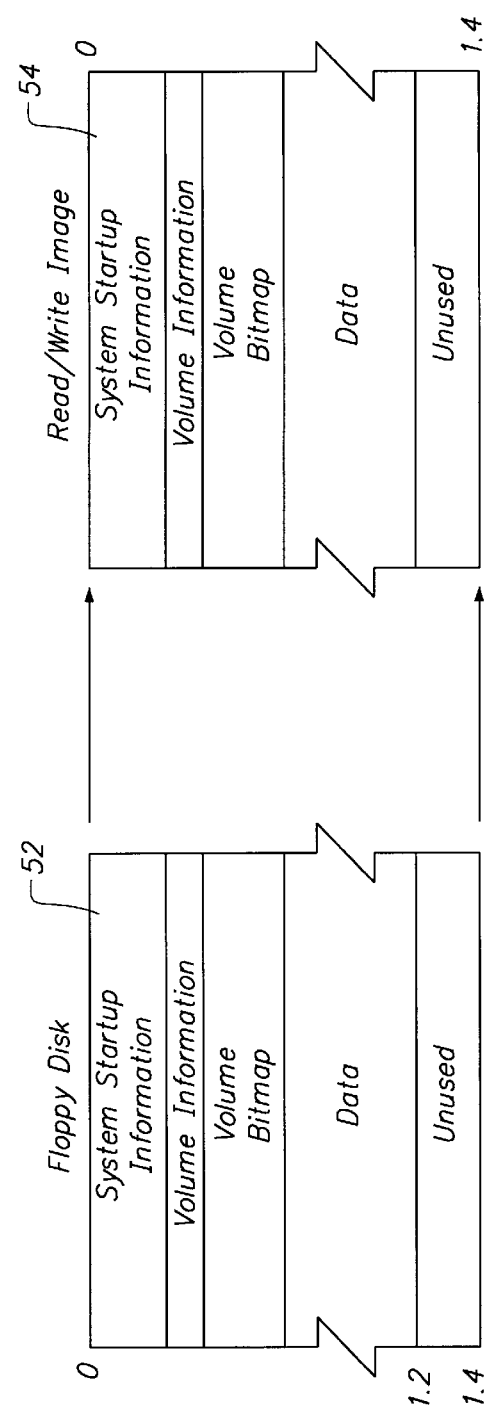
FIGS. 4A–4C are block diagrams of different disk image formats.
Figure 4B:
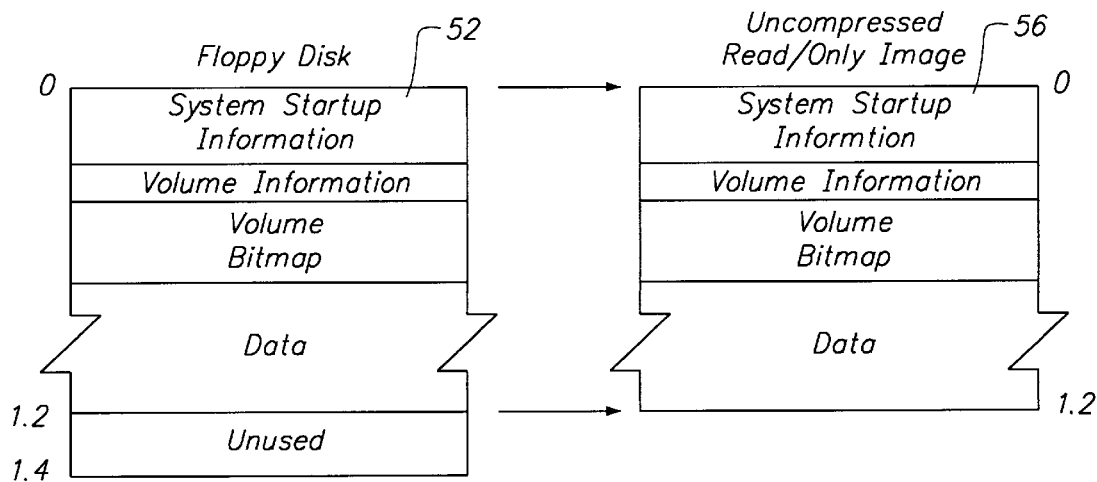
Figure 4C:
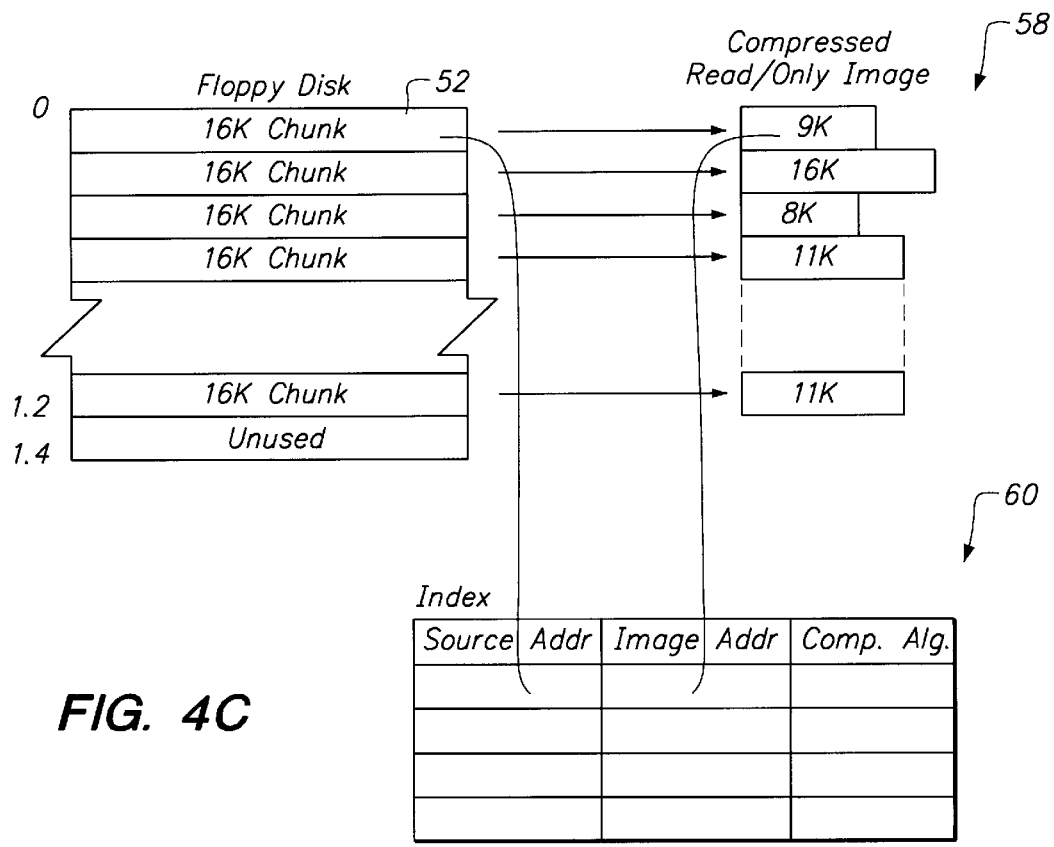

In accordance with one aspect of the present invention, a disk image can have any one of a number of different formats. Three such formats, namely uncompressed read/write, uncompressed read/only, and compressed read/only, are illustrated in FIGS. 4A–4C, respectively, for an illustrative example in which a 1.4 MByte floppy disk 52 is imaged. In this particular example, only 1.2 MByte of the total storage capacity of the disk is used to store data and volume-related information. The last 200 kilobytes are unused. The image file 54 of FIG. 4A is in the uncompressed read/write file format. An image file in this format contains every logical block of the source volume. Therefore, the image file 54 has a size of 1.4 MBytes, including 200 kilobytes which relate to the unused portion of the floppy disk. When this disk image is mounted, it will appear as a 1.4 MByte volume, from which the stored data can be read. In addition, new data can be written into the unused storage blocks.

If there is no need to write information to the disk image, it is preferable to store it in a read/only format which saves storage space. In this format, the size of the disk file is commensurate with only the used portion of the source volume. Referring to FIG. 4B, an uncompressed read/only disk image 56 is a file which contains only the actual data of the disk 52, and hence has a size of 1.2 MByte. However, when mounted, this image still appears as a 1.4 MByte volume, since the volume information stored in logical block 2 is the same as that for the original floppy disk 52. The data stored in the first 1.2 MBytes of the address range for the volume is read in the normal manner by the disk driver. If an attempt is made to read data from an address corresponding to the unused portion of the floppy disk, the disk driver returns a value of zero, based on information contained in an index resource, described below.

To obtain the greatest savings in storage space, the compressed read/only format is employed. In the creation of a compressed read/only image file, the original data is divided into "chunks" of any suitable size. In the example of FIG. 4C, the data stored on the floppy disk 52 is divided into chunks of 16 kilobytes each. Each chunk is separately compressed and stored in the image file 58. Depending upon the nature of the data, different compression algorithms can be employed for the various chunks of data, to obtain the most efficient compression for the file as a whole. As a result, different chunks can be compressed by different amounts, and some chunks may not be compressed at all. Thus, information which is frequently accessed, such as directories and catalogs, might not be compressed, to increase the speed with which they are read. Although all of the source data chunks in the example of FIG. 4C have the same size, there is no requirement that they do so. Rather, the different chunks could be of various sizes, to accommodate different compression algorithms, for example.

Associated with the compressed image file is an index resource 60. This index comprises a mapping of the logical blocks of the source volume 52 to byte ranges in the compressed image file 58. The index also contains information which identifies a particular compression algorithm that was used on the associated chunk of data, and perhaps also the sizes of the chunks, to thereby provide information on the manner in which to decompress the data from the file 58.

The index 60 can also be employed in connection with the other disk image file formats. For example, in the case of the uncompressed read/only format of FIG. 4B, the index contains information that the last 200 kilobytes of the source volume are not mapped into the disk image 56, and therefore have a value of zero. In the case of the uncompressed read/write formats of FIG. 4A, there is no need for an index since the image file stores every block of the source volume.

Another format for a disk image is a compressed read/write format. In this format, the user can specify a container of a particular size, e.g., a 1-Gigabyte volume. A disk image file is then created with the appropriate volume information pertaining to such a volume. When initially created, the disk image could be empty, i.e. contain no file data. When a command is generated to write data to the disk image, the data is segmented into suitably sized chunks, if necessary, and each chunk is compressed as appropriate. Each compressed chunk of data is then added to the disk image file, and the appropriate mapping and compression data is entered into the index 60. Thus, the disk image file grows as data is written to it, up to the limit of its specified capacity.

Referring again to FIG. 3, in operation the driver 50 for the disk image 30 contains data which identifies the physical device 31 on which the image is actually stored, and the address for the first byte of data in the image file 30 on that device, which constitutes an offset address. When the driver is provided with a data address from the operating system, it employs this data address, together with the offset address for the image file, to locate and read the requested data. If the image file is in a read/only or compressed format, the driver refers to its associated index resource 60. Upon receipt of a data address from the operating system, the driver determines where the compressed data corresponding to that address is stored, and the appropriate algorithm necessary to decompress the data. The compressed data is then retrieved, decompressed, and provided to the operating system. If the driver receives a data address corresponding to part of the source volume which is unmapped in the index resource 60, e.g. the last 200 kilobytes in the example of FIG. 4B, the driver returns a value of zero to the operating system for all data at such addresses.

Figure 5:
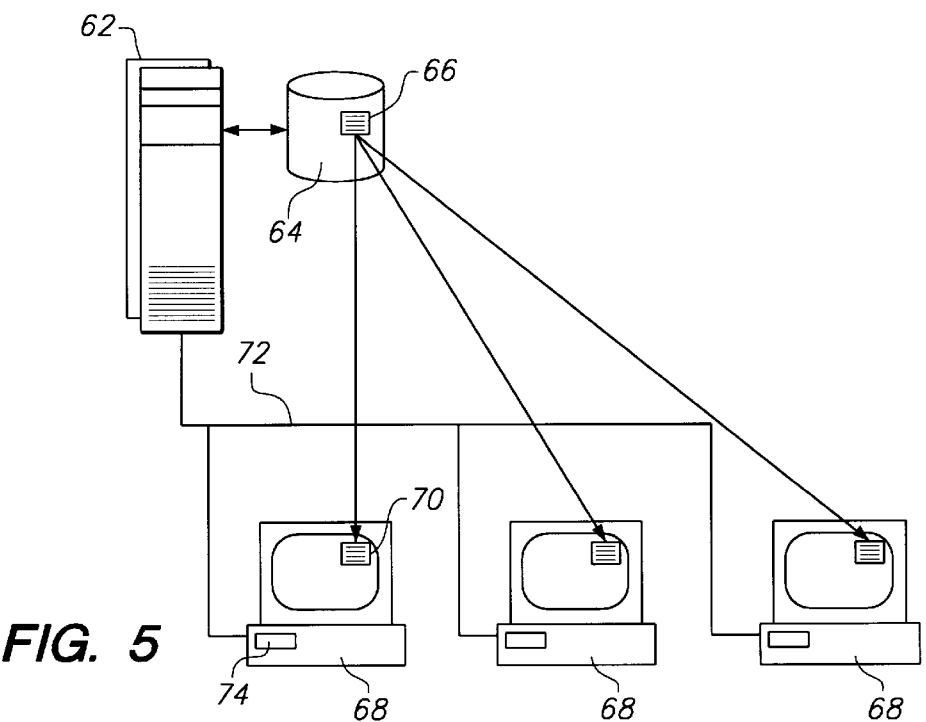
FIG. 5 is a block diagram of a software distribution system which employs a disk image.

Disk image files of the type described above, which emulate the entire contents of the storage volume, can be employed in the electronic dissemination and replication of software. FIG. 5 illustrates an example of a computer network in which a software program is to be installed on a plurality of individual computer systems. A network server 62 has an associated disk drive 64 or other type of storage device. A disk image 66 is stored on the device 64, and contains all of the files for a software program that is to be installed on remote client computers 68. In this particular case, the disk image 66 can be one of the two read/only formats. To perform the installation, the disk image 66 is mounted at each of the client computers 68, as indicated by an associated icon 70 on each computer's display. In this particular case, the disk image is mounted as a remote volume, which is accessed through a communication network 72. This network could be a local area network, for example, or a much larger wide-area network, such as the internet. Once the disk image is mounted at the individual computers 68, they can copy its contents to their local disk drives 74, to thereby install the software. The particular advantage of this approach is the fact that the installation at each remote computer 68 is controlled by the individual client computers themselves, and therefore does not require the resources of the network server 62. Consequently, installation can take place on a number of client computers 68 simultaneously.

Several advantages are associated with the creation of disk images to emulate mountable storage volumes and disseminate software. For example, by creating an image of an entire volume, the individual files themselves remain intact. As such, it is possible to employ a checksum technique, or similar such type of data integrity check, to provide end-to-end verification that files have been successfully transferred. More particularly, the disk image 66 contains all of the contents of a source volume (not shown). When the disk image 66 is to be created, the network server 62 can calculate a checksum for the source volume, and store this value in the volume information, which is then included in the disk image file 66. Subsequently, when a remote client computer copies the contents of the disk image file to its own disk drive 74, it can run a checksum on the copied data to determine whether the same value is obtained.

Another advantage stemming from the use of images of entire storage volumes is the fact that the dissemination of files can be independent of the file systems themselves. For example, with reference to FIG. 5, the source volume from which the disk image 66 is created can be formatted for a given type of file system, e.g. DOS. However, the disk drives 74 for the remote client computers 68 might be formatted in accordance with a different type of file system, e.g. HFS. To permit the disk image 66 to be mounted and read at the client computers, the disk driver 50 for reading disk images is provided with information relating to different disk formats. For this purpose, when the driver is first opened it loads a table which contains a list of file types that it is capable of recognizing. For each type, the table contains entries which provide the information needed to access data in files of that type, e.g. how to identify the beginning and end of a block of data. The table might also indicate the type of operations that are allowed for each file type, e.g. read/write or read-only. In the particular example described above, therefore, the disk driver includes information regarding the DOS format, so that it can tell where data begins and ends in the image file 66. Using this information, the disk driver is able to read the data in the image file 66, and provide it to the operating system for the remote client computer 68, so that it can be stored on the local disk drive 74 in the format required by the file system for the computer 68. Thus, a disk image stored on server which employs any given file system can be mounted on and accessed by a computer which uses a different type of file system, without affecting the integrity of the files themselves.

Figure 6:
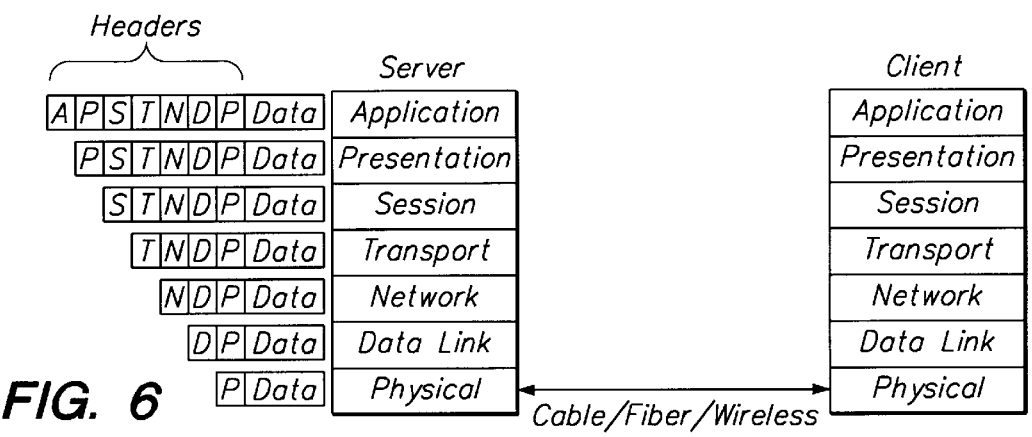
FIG. 6 is a block diagram of network communication layers.

Another advantage associated with the distribution of software via disk images lies in the reduced bandwidth requirements for disseminating the images over networks. Typically, most network communications are carried out through various layers that comprise distinct levels of capabilities, or services, that build upon one another. One well-known layer architecture is the OSI reference model, which employs seven layers to describe network activities. These seven layers are depicted in the block diagram of FIG. 6. A given layer on a computer uses a predefined protocol to communicate with that layer's counterpart on another computer. Except for the lowest, physical layer, however, the communications between the respective layers are indirect. In other words, direct communications take place between the physical layers, at which details of cable connections and electrical signaling are specified. Each layer above the physical layer communicates with the layers below it to send information. As part of the process for sending a data packet, each layer adds it own header to the actual data being communicated. Thus, for communications between the two highest layers, i.e. the application layers, a significant amount of overhead is associated with the network communications, as indicated in FIG. 6. This overhead requires additional bandwidth to transmit the data, as well as additional processing time at the receiving computer to strip each layer's associated header, and communicate the remaining information to the layer above it.

Typically, when a file is transferred from one computer to another via their respective file managers, such communications take place through all seven layers of the network architecture. However, since a disk image functions as a physical device on the computer system, only the lowest level protocols need to be employed to communicate over the network. The services of the higher level layers are not needed. For example, transfer of volume information, to permit a disk image to be mounted, only requires the two lowest protocol layers. Consequently, the overhead associated with the higher layers can be avoided, thereby enabling the transfer to take place at extremely high speeds.

Figure 7:
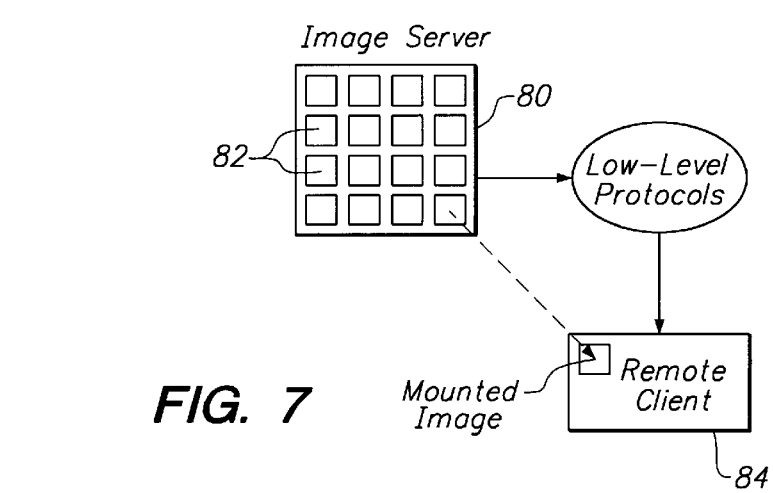
FIG. 7 is a block diagram of an image server system.

This capability is particularly advantageous in the case of graphic files, which typically contain large amounts of data. In one implementation of the invention, an image server can be employed to provide large graphic files to remote sites. Referring to FIG. 7, the image server has an associated storage medium 80 containing disk images 82 which relate to different respective graphic files. Using low level network protocols, individual images can be mounted at remote client computers 84. Thus, the client computers can access the information in the image files over the network at extremely high speeds. Alternatively, the image files can be copied from the network server to the client computer by means of low-level network protocols, and then mounted at the client computer. With this approach, large image files can be accessed without having to use higher level network protocols, and be encumbered by the overhead associated with them. Another advantage, discussed previously, is the fact that the image server need not use the same file formatting as the client computers. As long as the disk image drivers at the client computers 84 are capable of reading the file format at the server, the disk images can be mounted as local volumes, independent of the file format employed at the server.

Figure 8:
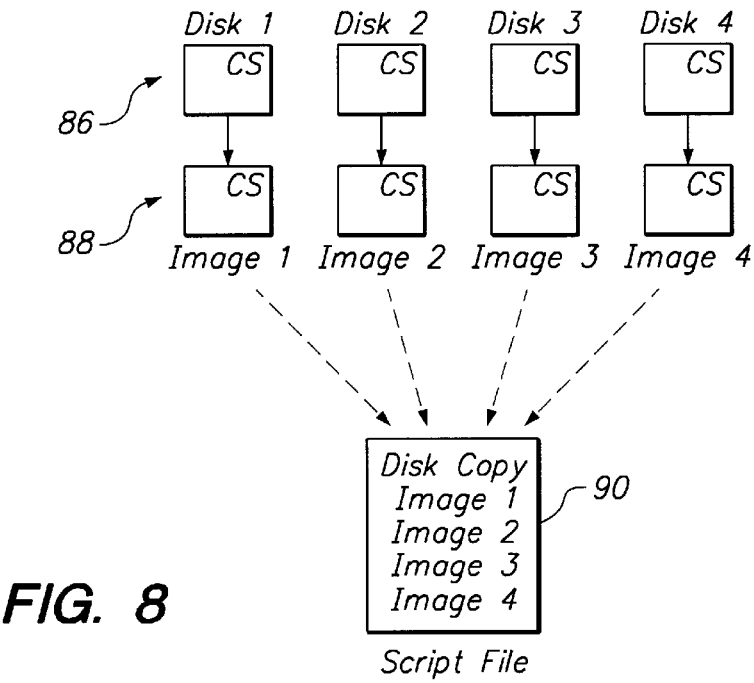
FIG. 8 is a block diagram of a script file for mounting images and taking specified actions.

In accordance with another aspect of the invention, disk images can be associated with pre-defined actions to be carried out. For example, it might be desirable to make back-up copies of files stored on a series of floppy disks. Referring to FIG. 8, files to be replicated are stored on a series of four floppy disks 86. Each disk may have a checksum (CS) computed for it. A disk image 88 is created for each of the four floppy disks. The checksum is included in the imaged information. Thereafter a script file 90 is created, which lists disk images to be automatically mounted and an action to be taken after the images have been mounted. For the example described above, the script file 90 could identify a disk copy utility application, followed by an identification of each image which is to be mounted and copied. The identification of the application and image files can specify the address at which they are to be found. This address could be a local address or a network address.

When the user actuates the script file, all of the identified images are mounted at the user's computer. If desired, a checksum operation can be carried out with respect to each mounted image, to verify its integrity. The specified application is then launched. In this case, the application creates a backup of each imaged disk on a floppy disk at the user's computer. Once the operation has been completed, the image files can be unmounted, if desired, or remain mounted on the user's computer, depending upon the user's preferences.

In this regard, the disk image driver can mark a mounted image as being "owned" by an application or process, such as the disk copy utility. If an imaged volume is owned, the driver checks at regular intervals whether the owning process is still executing. If the process is no longer executing, the volume is marked as unowned and the driver then unmounts it. If no application program is specified in the script file, the identified disk images are simply mounted in response to launching of the script file and marked as unowned. In this case the user must manually unmount the volumes.

Figure 9:
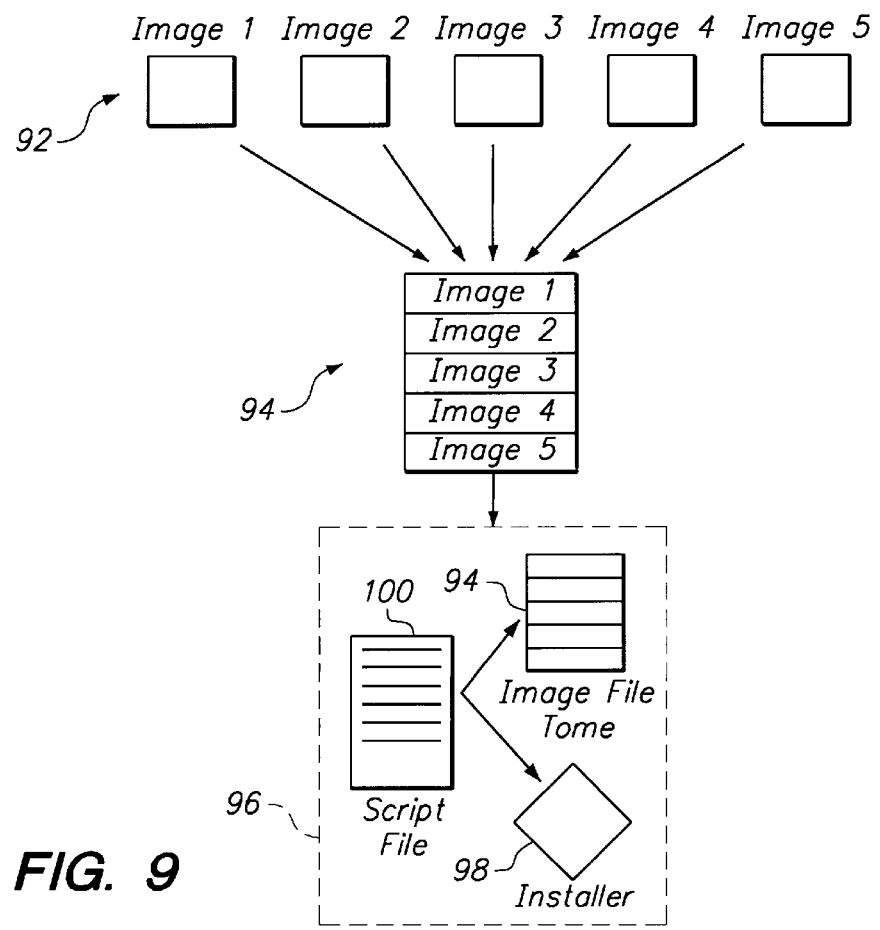
FIG. 9 is a block diagram of an installer system in accordance with the present invention.

The foregoing aspect of the invention can be employed to create a "onebutton" installer that is not limited in the number and/or size of files that can be installed. Referring to FIG. 9, disk images 92 are created for one or more volumes containing the files to be installed. These images are then concatenated into a single file 94, which constitutes an image file tome. Each image in the tome might have an associated index resource. Since all of the files remain intact and separately defined within the respective images 92, and the images are unmodified in the image-file tome 94, the original integrity of the files is unaltered. As such, there is no need to requalify any of the files within the tome 94 to ensure their integrity for subsequent installation.

An installation package 96 comprises three elements, namely a conventional installer program 98, the image file tome 94, and a script file 100. The script file identifies the images to be mounted for the installation process, and launches the installer program once the images have been mounted. The program then operates in the normal manner to install the appropriate files from the mounted images onto a computer system. By means of this approach, prior limitations that were placed on installation processes, regarding the number and size of files that can be handled, are overcome, since each image only constitutes a single image file even though it may contain a large number of individual data files. Furthermore, since the user is only required to perform a single action, namely launch the script file, the installation takes place in a true "one-button" manner.

From the foregoing, therefore, it can be seen that the present invention provides an efficient procedure for the dissemination and replication of files in an electronic format which is not limited by the sizes of the files themselves. Through the creation of disk images and mounting of the images at remote computers, ready access is provided to the files in a speedy manner, through the use of low level network communication protocols. Through the availability of different types of formats, backing storage can be used in a manner which is most efficient, taking into account the needs of the user. Furthermore, the mounting and transfer of files is carried out independently of file systems themselves, thereby allowing files to be shared among users of different types of computer system.

It will be appreciated by those of ordinary skill in the art that the present invention can be embodied in other specific forms without departing from the spirit or essential characteristics thereof. The presently disclosed embodiments are therefore considered in all respects to be illustrative and not restrictive. The scope of the invention is indicated by the appended claims rather than the foregoing description, and all changes that come within the meaning and range of equivalence thereof are intended to be embraced therein.

What is claimed:

1. A system for accessing computer-readable files stored on a source device, by a plurality of target computers comprising:

means for creating a disk image of the source device, wherein said source device is a physical storage volume on which said computer-readable files to be accessed by said plurality of target computers are located, and for storing said disk image on a storage device that is accessible to said plurality of target computers, wherein said disk image is a virtual representation of said physical storage volume such that it includes volume format information that reflects the format of said physical storage volume, and which enables said disk image to be mounted at each of said plurality of target computers; and a disk image driver at each of said plurality of target computers having access to file format information which enables said target computers to read files, which exhibit different file formats, contained on said disk image.

2. The system of claim 1 wherein said disk image driver includes an index which identifies correspondence between address location in said storage volume and address locations in said disk image.

3. The system of claim 2 wherein said disk image contains a compressed version of data in said files, and wherein said index further includes information pertaining to the manner in which the data was compressed.

4. The system of claim 3 wherein the data in said disk image is divided into individual chunks which are separately compressed and said index contains, for each chunk, the address of the chunk of data in the file, the address for the corresponding compressed data in the disk image, and an identification of a compression algorithm via which the data of that chunk was compressed.

5. The system of claim 4 wherein different chunks of data are compressed via different respective algorithms.

6. The system of claim 4 wherein different chunks of data have different respective sizes.

7. The system of claim 1 wherein said disk image driver includes data pertaining to different types of file systems, to thereby enable said disk image driver to access disk images stored in different disk image file formats respectively related to said different types of file systems.

8. The system of claim 1, wherein said disk image is stored on the storage device in a compressed read/only format comprising a file which contains compressed versions of chunks of data stored in said physical storage volume, and an index which provides a mapping between logical address blocks in said physical storage volume and addresses of corresponding compressed data in said file.

9. The system of claim 8, wherein said index contains information pertaining to the manner in which the chunks of data were compressed.

10. The system of claim 9, wherein the data in said volume is divided into individual chunks which are separately compressed and said index contains, for each chunk, the address of the chunk of data in said physical storage volume, the address for the corresponding compressed data in said disk image, and an identification of a compression algorithm via which the data of that chunk was compressed.

11. The system of claim 10, wherein different chunks of data are compressed via different respective algorithms.

12. The system of claim 10, wherein different chunks of data have different respective sizes.

13. The system of claim 10, wherein said uncompressed read/only format also has an associated index which provides a mapping between logical address blocks in said physical storage volume and addresses of corresponding data in the file.

14. The system of claim 1, wherein said disk image is stored on the storage device in a read/write format comprising a file which contains a copy of every logical address block in said physical storage volume, regardless of whether the blocks contain data.

15. The system of claim 1, wherein said disk image is stored on the storage device in an uncompressed read/only format comprising a file which contains volume information and a copy of only those logical address blocks of the physical storage volume which contain data.

16. A method for providing a remote computer access to files stored on a source device, comprising the steps of:

creating a disk image of said source device, wherein said source device is a physical storage volume which contains said files to be accessed by said remote computer, and wherein said disk image is a virtual representation of said physical storage volume in that said disk image includes volume format information that reflects the format of said physical storage volume;

generating a script file which includes an identification of said disk image;

launching said script file at said remote computer; and mounting, at said remote computer, the disk image identified in said script file using a disk image driver that has access to volume format information which is needed to mount files, exhibiting different file formats, on the disk image.

17. The method of claim 16 wherein said script file also includes an identification of an executable program, and further including the step of running said program at the remote computer after mounting said disk image.

18. The method of claim 17 wherein said program is an installer program which installs files from the mounted disk image onto the remote computer.

19. The method of claim 16 wherein a plurality of disk images are created and identified in said script file, and wherein all of the disk images identified in said script file are mounted at said remote computer.

20. The method of claim 16 further comprising the step of:

selectively storing said disk image in a storage medium device in any one of the following disk image file formats:

a read/write format comprising a file which contains a copy of every logical address block in said physical storage volume, regardless of whether the blocks contain data;

an uncompressed read/only format comprising a file which contains volume information and a copy of only those logical address blocks of said physical storage volume which contain data; and a compressed read/only format comprising a file which contains compressed versions of chunks of data stored in said physical storage volume, and an index which provides a mapping between logical address blocks in said physical storage volume and addresses of corresponding compressed data in said file.

* * * * *

UNITED STATES PATENT AND TRADEMARK OFFICE
CERTIFICATE OF CORRECTION

PATENT NO. : 5,991,542
DATED : November 23, 1999
INVENTOR(S) : Bryon B. Han, et al.

It is certified that an error appears in the above-identified patent and that said Letters Patent is hereby corrected as shown below:

In the claims: Column 10, Line 67, after the word "computers" insert a coma --,--.

Signed and Sealed this

Seventeenth Day of April, 2001

*Attest:*

NICHOLAS P. GODICI

*Attesting Officer*  *Acting Director of the United States Patent and Trademark Office*